United States Patent [19]

Reiter

[11] Patent Number: 4,533,035
[45] Date of Patent: Aug. 6, 1985

[54] CONVEYOR BELT CLEANER
[75] Inventor: Robert C. Reiter, Darby, Mont.
[73] Assignee: Material Control, Inc., Croswell, Mich.
[21] Appl. No.: 567,989
[22] Filed: Jan. 4, 1984
[51] Int. Cl.³ .......................................... B65G 45/00
[52] U.S. Cl. .................................... 198/499; 15/256.5
[58] Field of Search ................ 198/497, 499; 15/256.5
[56] References Cited

U.S. PATENT DOCUMENTS

| | | | |
|---|---|---|---|
| 1,543,411 | 6/1925 | Wittig | 198/495 |
| 1,719,094 | 7/1929 | Vickery | 15/256.51 |
| 1,792,501 | 2/1931 | Maniere | 198/499 |
| 1,880,002 | 9/1932 | White | 198/624 |
| 1,975,591 | 10/1934 | Sinden | 198/499 |
| 2,168,622 | 8/1939 | Levin | 198/842 |
| 2,255,314 | 9/1941 | Graham | 384/546 |
| 2,551,123 | 5/1951 | Heller | 198/230 |
| 2,724,999 | 11/1955 | Scott | 92/74 |
| 2,794,540 | 6/1957 | Sinden | 198/230 |
| 2,850,146 | 9/1958 | Madeira | 198/109 |
| 3,088,156 | 5/1963 | Ljungquist et al. | 15/256.53 |
| 3,315,794 | 4/1967 | Ellington | 198/230 |
| 3,342,312 | 9/1967 | Reiter | 198/230 |
| 3,504,786 | 1/1968 | Matson | 198/230 |
| 3,598,231 | 8/1971 | Matson | 198/230 |
| 3,631,968 | 1/1972 | Ward | 198/230 |
| 3,656,610 | 4/1972 | McWilliams | 198/230 |
| 3,688,336 | 9/1972 | Costello, Jr. et al. | 15/256.51 |
| 3,722,667 | 3/1973 | Olson | 198/230 |
| 3,740,789 | 6/1973 | Ticknor | 15/256.53 |
| 3,750,228 | 8/1973 | Wake | 15/256.53 |
| 3,986,227 | 10/1976 | Fathergill et al. | 15/256.53 |
| 3,994,384 | 11/1976 | Reiter | 198/497 |
| 3,994,388 | 11/1976 | Reiter | 198/499 |
| 4,019,217 | 7/1977 | Schinke | 15/256.53 |
| 4,036,351 | 7/1977 | Reiter | 198/499 |
| 4,036,354 | 7/1977 | Reiter | 198/499 |
| 4,042,364 | 8/1977 | King et al. | 65/168 |
| 4,098,394 | 7/1978 | Stahura | 198/499 |
| 4,344,525 | 8/1982 | Bancroft | 198/499 |

FOREIGN PATENT DOCUMENTS

| | | |
|---|---|---|
| 910834 | 9/1972 | Canada . |
| 960990 | 1/1975 | Canada . |
| 862003 | 2/1941 | France . |
| 0002111 | 1/1983 | Japan .................... 198/499 |
| 572062 | 9/1945 | United Kingdom . |

OTHER PUBLICATIONS

Martin Engineering Company Brochure, Form No. 2005, entitled "Vibratory Torsion Arm Belt Cleaner", 4 pages, (Copyright 1967).
Stephens-Adamson Mfg Co., Bulletin No. 1854, (3M-S-6-60), entitled "S-A Spring Type Conveyor Belt".
Martin Conveyor Products, Installation and Service Manual, Form No. 2894-1/80, entitled Martin Trac--Mount Belt Cleaner", 74 pages.
Martin Conveyor Products Brochure, entitled "Martin Trac-Mount Systems", 8 pages, (Copyright 1979).
Vibrolator Mfg. Co. Blueprint, entitled "Belt Cleaner Spring Arm", Drawing No. A-15189, Dec. 6, 1967.
Martin Engineering Co. Brochure, entitled "Vibratory Torsion Arm Belt Cleaner", Form No. 1289-1068, 2 pages.
Stephens-Adamson Mfg. Co. Catalog, entitled "Stephens-Adamson Catalog 6 6", Cover Page and pp. 65-66, Copyright 1954.
Martin Engineering Co. Brochure, entitled "Mounting Instructions Heavy Duty PM Model Belt Cleaners", Form No. 2620-1173, 1 page.
Conveyor Components Co. Catalog, entitled "Conveyor Components", Catalog No. C-216, 32 Pages (Copyright 1970, 1975, 1977).
Conveyor Components Co. Catalog, entitled "Conveyor Components", Catalog No. C-218, 32 Pages (Copyright 1970, 1975, 1977, 1980, 1981).
Conveyor Components Co. Brochure, entitled "Model FA", pp. 6 and 7.

*Primary Examiner*—Joseph E. Valenza
*Assistant Examiner*—Lyle Kim
*Attorney, Agent, or Firm*—Cullen, Sloman, Cantor, Grauer, Scott & Rutherford

[57] ABSTRACT

A conveyor belt cleaner having at least one blade yieldably mounted on a blade support assembly for scraping an endless belt. The blade support assembly includes a spring support and a spring cradle pivotally mounted within and angularly adjustable upon and secured to the spring support. A helical spring is mounted within the spring cradle and has one end anchored thereon. The other end of the helical spring terminates in a spring arm for supporting the blade.

15 Claims, 5 Drawing Figures

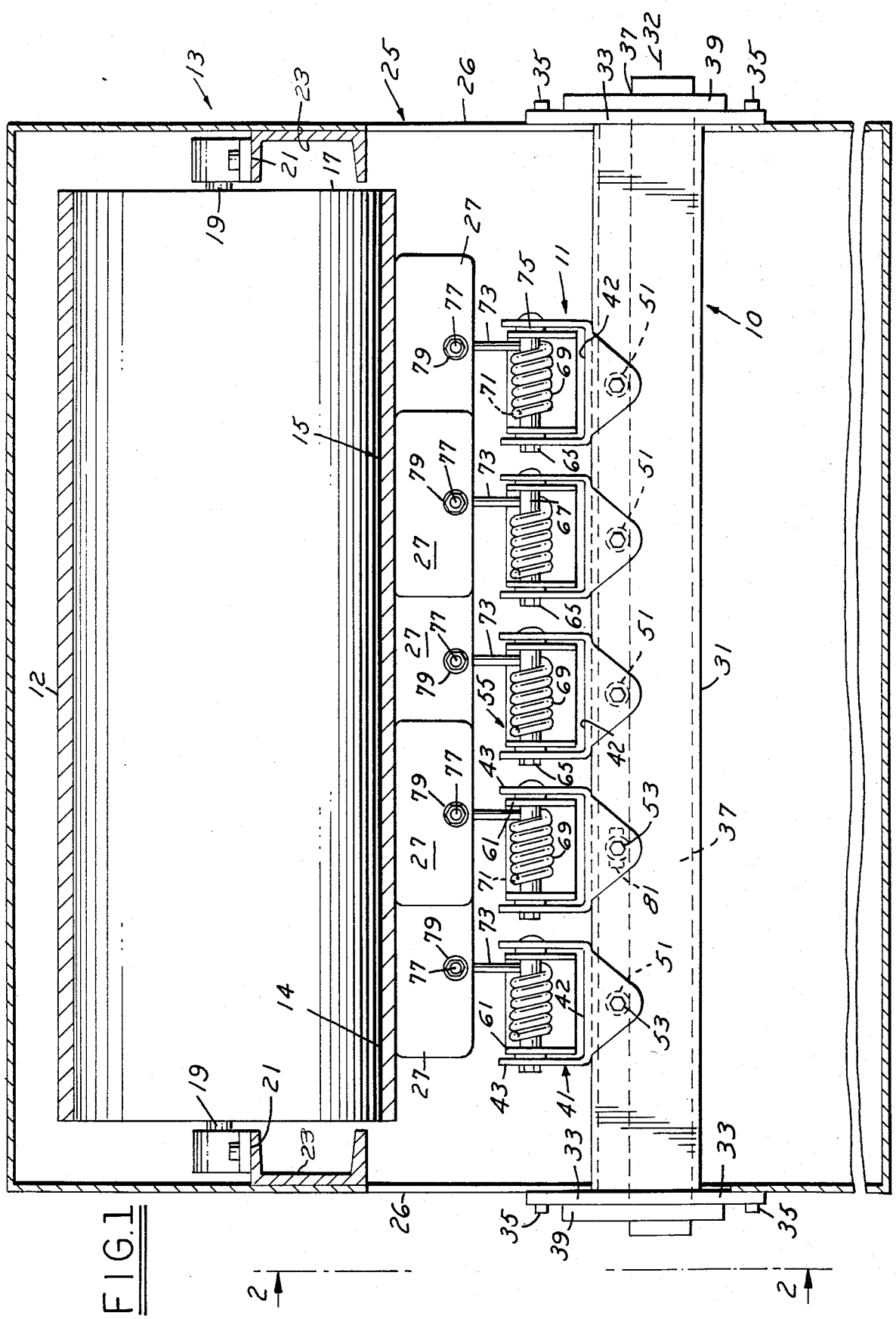

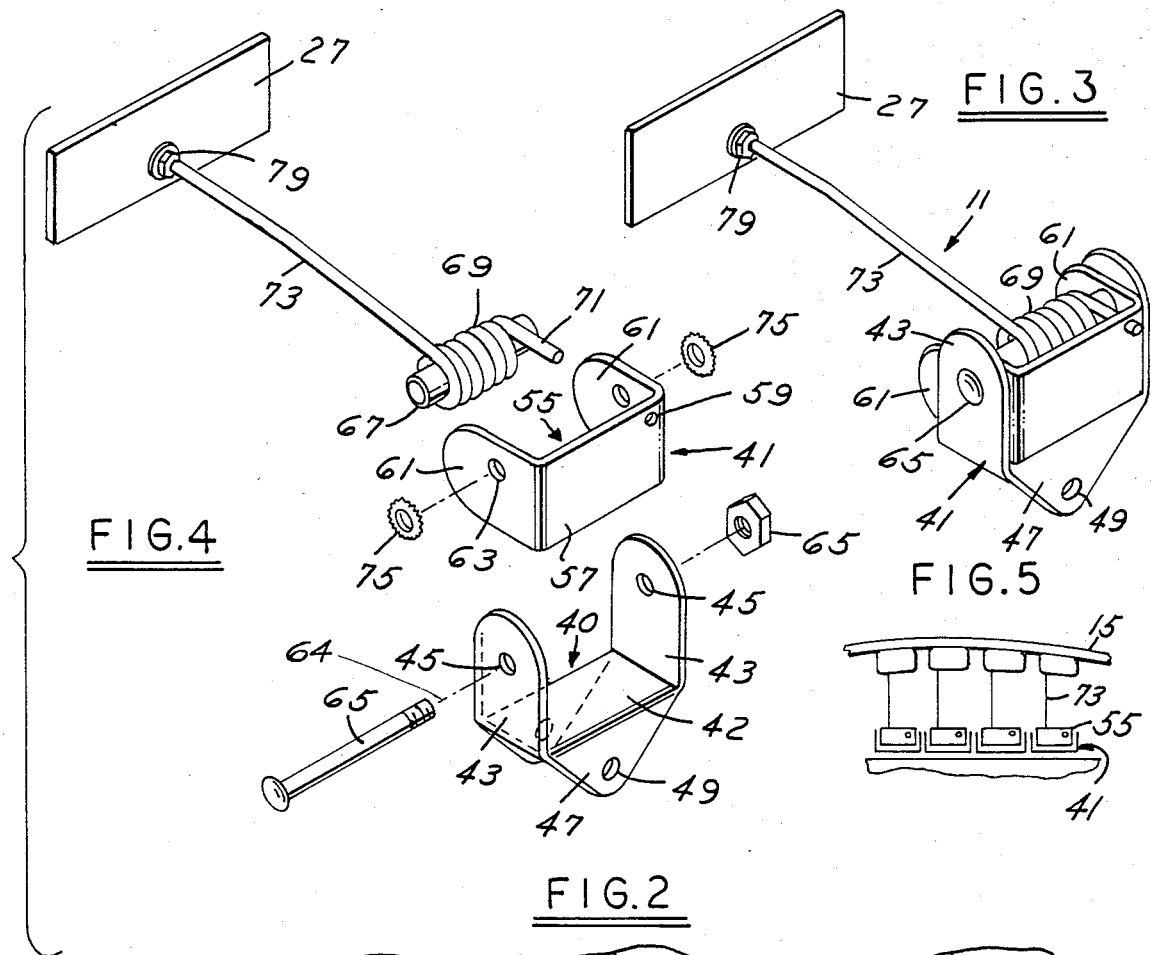
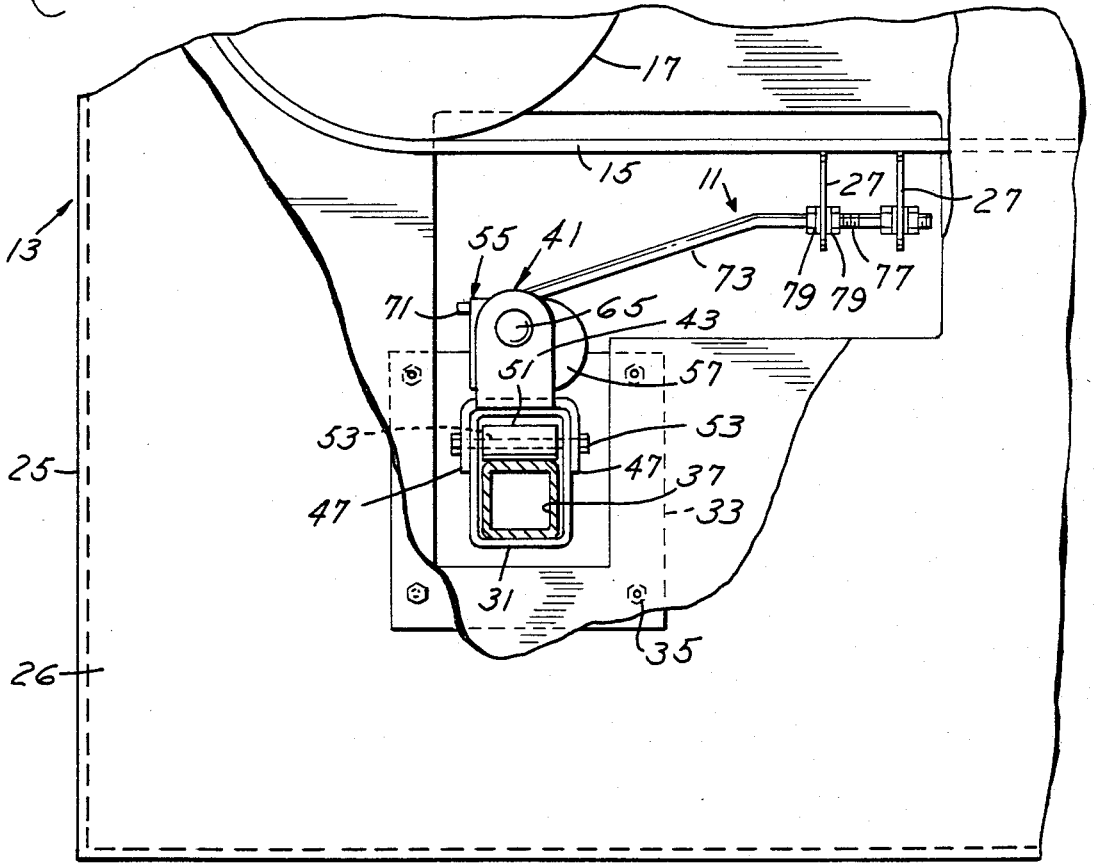

CONVEYOR BELT CLEANER

FIELD OF THE INVENTION

The present invention relates to conveyor belt cleaners and more specifically to conveyor belt cleaners having helical spring arms provided with blades for removing from the conveyor belt abrasive and/or foreign materials.

BACKGROUND OF THE INVENTION

Conveyor belt cleaners have been used on conveyors for continuously cleaning the surface of a moving conveyor belt by scraping debris or foreign materials from the lower run thereof. Conveyor belt cleaners are normally mounted beneath the lower run of the conveyor belt. From time to time as the wiper scraper blades wear from use, it becomes necessary to readjust the scraper arm or support so that at all times the scraper or blade is in operative engagement with the conveyor belt.

THE PRIOR ART

Examples of U.S. prior art patents relating to conveyor belt cleaners which are owned by the assignee of record include the following patents: U.S. Pat. Nos. 3,342,312; 3,656,610; 3,994,384; 3,994,385; 3,994,388; 4,036,351; 4,036,354; and 4,053,045. A patent owned by another is U.S. Pat. No. 3,674,131 entitled "Conveyor Cleaner with Elastomer Spring".

SUMMARY OF THE INVENTION

An important feature of the present invention is to provide an improved conveyor belt cleaner wherein one or a plurality of scraper blades are individually mounted upon an independent blade support assembly located on a suitable support within a portion of the conveyor assembly so that the scraper blade may be individually adjusted for proper operative engagement with the return run of the conveyor belt.

Another feature includes an improved blade support assembly adapted for mounting upon a support transversely underlying an endless conveyor belt and wherein a series of spaced blade supporting assemblies are so mounted end to end thereon. With such a construction each of the blade support assemblies includes for each blade an individual spring support of U-shape configuration which rotatively nests therein a spring cradle pivotally adjustable thereon. A helical spring is mounted upon the spring cradle and is anchored thereto, with a free end of the spring extending laterally thereof thus providing a spring support arm for the scraper blade.

A further feature provides for the individual angular adjustment of the spring cradle with respect to the corresponding spring support so as to provide independent angular adjustment of the corresponding spring arm which places the blade in operative engagement with the conveyor belt.

A still further feature of the present invention contemplates an improved blade support assembly which includes a spring cradle pivotally adjustable about an axis with respect to a spring support. The cradle anchors one end of a helical spring. The other end of the spring terminates in a transverse spring arm or support for a scraper blade. The cradle may be angularly adjusted with respect to the spring support and secured in such an angularly adjusted position for regulating the inclination of the spring arm thereby bringing the scraper blade into cooperative engaging registry with the conveyor belt.

These and other objects and features will be seen from the following specification and claims in conjunction with the appended drawings.

BRIEF DESCRIPTION OF THE DRAWINGS

FIG. 1 is a vertical section of the present conveyor belt cleaner adjustably mounting a plurality of scraper blades for operative engagement with the undersurface or return run of an endless conveyor belt.

FIG. 2 is a fragmentary side view taken in the direction of arrows 2—2 of FIG. 1, with parts broken away.

FIG. 3 is a perspective view of the present blade support assembly and scraper blade.

FIG. 4 is an exploded view of the assembly shown in FIG. 3.

FIG. 5 is a schematic view illustrating the independent adjustment of the scraper blades with respect to an irregular surface of an endless conveyor belt.

It will be understood that the above drawings illustrate one embodiment of the invention and that other embodiments are contemplated within the scope of the claims hereafter set forth.

DETAILED DESCRIPTION OF A PREFERRED EMBODIMENT OF THE INVENTION

Referring now to the drawings, the novel conveyor belt cleaner 10 is constructed, arranged and installed on a conveyor 13 which is of conventional construction as is illustrated in FIGS. 1 and 2. The conveyor 13 includes an endless conveyor belt 15 comprising an upper run or strand 12 and a lower run or strand 14 driven by means of a pair of idler rollers 17, one provided at each end of the conveyor belt 15 in the usual manner. At least one of the rollers 17 is powered by means of a motor, not shown. The idler rollers 17, FIGS. 1 and 2 are each provided with a pair of axially extending support shafts 19. The conveyor 13 includes a support frame, hood or housing 25 having a pair of spaced opposed side walls 26. Secured to the channel framework of the conveyor 13 are longitudinally extending channel members 23. Opposed bearing supports 21 are mounted on the upper flange of the channel members 23. The axial support shafts 19 provided on each of the idler rollers 17 are supported and journaled within the bearing supports-21 as illustrated in FIG. 1. The side walls 26 are usually attached to the channel members 23 by means not shown.

An elongated tubular support member 31 has an elongated axis 32 and is spaced below the return or lower run 14, generally beneath the nonpowered driven idler roller 17. The support member 31 is in the form of a tube of rectangular cross-section. It extends between the side walls 26 of the conveyor housing 25 and has secured thereto a pair of end plates 33 which bear against or abut the outer surfaces of the side walls 26 and are secured thereto by a plurality of fasteners 35. An elongated support tube 37 of square shaped configuration is nested within and extends along the length of the support member 31. The support tube 37 projects outwardly of the side walls 26 through the tube anchor plates 39 which are secured by fasteners, not shown, to the conveyor side walls 26.

The novel blade support assemblies 11 are provided with wiper or scraper blades 27, FIGS. 1 and 3, of which a plurality are shown in a staggered relationship (FIG. 2). The blade support assemblies 11 are spaced and adjustably mounted upon the elongated support member 31 as best illustrated in FIG. 1.

Each blade support assembly 11 includes a spring support assembly 41 shown in prespective in FIG. 3 and in the exploded view of FIG. 4. The spring support assembly 41 includes a U-shaped spring support 40 having a base 42 and a pair of upstanding tabs 43, each apertured at 45. The base 42 of the spring support 40 terminates on opposite sides thereof in a pair of depending mount flanges 47, each of which is apertured at 49. One blade support assembly 11 or a plurality of such assemblies 11, each including a spring support assembly 41 are spaced along the elongated support member 31 and are secured thereto by a plurality of machine bolt and nut assemblies 53 which extend through the apertures 49 of mount flanges 47 and through elongated slots 81 provided in the support tube 31 thereby providing a means for fixedly securing the spring support assemblies 41 upon the support member 31.

In the illustrative embodiment, an apertured roller 51 (FIGS. 1 and 2) is mounted upon each machine bolt or screw assembly 53 within the support tube 31 and bear upon the top surface of the interior tube 37.

The spring support assembly 41 also includes a spring cradle 55, FIGS. 3 and 4, having a base 57 which is apertured at one end at 59. The base 57 has a pair of end support arms 61, each apertured at 63. The spring cradle 55 is mounted between the upstanding tabs 43 of the spring support 40, which is of U-shaped configuration. With the spring cradle 55 mounted within the spring support 40, with the apertures 45 and 63 aligned, a bolt and nut assembly 65 extends through the apertures in the tabs 43 of the spring support 40 and the arms 61 of the spring cradle 55, respectively. Within the spring cradle 55, there is positioned or located a tubular sleeve 67, FIG. 1, which may be in the form of a steel pipe or the like. Assembled over the sleeve 67 and the bolt and nut assembly 65 is a helical or coiled spring 69 that nests within the spring cradle 55. One end of the helical spring 69 terminates in the outwardly extending spring anchor or rod portion 71 which extends through the base aperture 59 of the spring cradle 55 for anchoring the spring 69 within the cradle 55, as shown in FIG. 3. The rod portion 71 is generally straight and of a relatively short length as illustrated.

The other end of the helical spring 69 terminates in the laterally extending spring arm or rod 73, which is long and straight and in an integral part of the spring 69. The rod 73 may contain one or more bends or angles as shown in FIG. 2 and as illustrated in the patents noted previously assigned to the assignee of record. The spring arm 73 has a threaded end 77, FIG. 2. The scraper blade 27, which may be made of metal or from a plastic material, is generally rectangular in shape and is centrally apertured to receive the threaded end 77 of the spring arm 73. Fasteners 79, with or without suitable lock washers, are threaded onto the spring arm 73 on opposite sides of blade 27 for fixedly securing the blade 27 in position on the spring arm 73 as shown in FIG. 2.

The blade support assembly 11, FIG. 1 includes the spring support assembly 41 as shown in FIG. 3 as a unit. The units may be adjustably positioned upon the support member 31 with the mount flanges 47 straddling the support member 31 and adjustably secured thereto as by the aforementioned transverse threaded fasteners 53.

A pair of serrated washers 75 or other type of lock washers are mounted upon the bolt and nut assembly 65 and interposed between the upstanding tabs 43 of the spring support 40 and the arms 61 of the spring cradle 55, respectively.

The elongated support member 31 extends along the first longitudinal axis 32 as mentioned previously. Axis 32 extends transversely of the endless conveyor belt 15. The bolt and nut assembly 65 extends along a second longitudinal axis 64 which is spaced above and extends parallel to the first longitudinal axis 32. The spring arm 73 extends in a direction substantially at right angles to the bolt and nut assembly 65 and to the second axis 64.

With the construction of the novel blade support assembly 11 just described, once the spring cradle 55 has been angularly adjusted with respect to the spring support 40, it may be secured in the angularly adjusted position by tightening the nut upon the bolt of the nut and bolt assembly 65. The serrated washers 75 cooperate in frictionally securing the spring cradle 55 in its angular position with respect to the spring support 40. At the same time, the spring arms or rods 73, which is of circular cross section throughout its length, is also angularly adjusted so that the corresponding blade 27 thereon is in cooperative registry with the return strand or run 14 of the endless conveyor belt 15, as illustrated in FIGS. 1, 2 and 5.

The wiper blades 27 may be laterally aligned or may be longitudinally staggered as shown in FIGS. 1 and 2 across the width of the conveyor belt 15. In situations or environments where the surface of the conveyor belt 15 is irregular, convex or concave, the individual wiper blades 27 may be adjusted with respect to the irregular surfaces of the conveyor belt 15, as is schematically illustrated in FIG. 5.

With such a construction, the respective blade support assemblies 11 are initially mounted and secured to the elongated support member or tube 31. Thereafter the individual spring support assemblies 41 may be manually adjusted with the nut and bolt assembly 65 loosened and with the spring cradle 55 angularly adjusted with respect to the spring support 40 so that the blade 27 is in proper operative registry with the undersurface of the return run 14 of the endless conveyor belt 15.

In the securing of the individual blade support assemblies 11 upon the tubular support member 31, it is contemplated that the apertures 81 (FIG. 1) through the support member 31 may be horizontally elongated to permit some relative adjustment of the blade support assemblies 11 upon the support member 31.

The coil or helical spring 69 includes as an integral part thereof the spring arm or rod 73. Such spring or spring arm 73 define a torsion spring which is elongated, slender and of circular cross-section from the threaded end 77 which mounts the blade 27 to the other end 71 which extends through the aperture 59 and is anchored in the spring cradle 55. It is made from a single piece of spring steel. The coils of the spring 69 provides a resilient mounting structure for the torsion arm 73 which absorbes vibration and shock and thereby minimizes fatigue of the spring arm to result in reduced breakage of the arms during use as is illustrated in my earlier U.S. Pat. No. 3,342,312 entitled "Conveyor Belt Cleaner", issued Sept. 19, 1967.

Having described my invention, reference should now be had to the following claims.

I claim:

1. A conveyor belt cleaner for use on a conveyor having an endless belt comprising;
   an elongated support member having a first longitudinal axis adapted to extend transversely of the endless belt;
   a blade support assembly mounted upon and overlying said support member and having a second longitudinal axis spaced from and parallel to said first axis;
   said blade support assembly including a spring support of U-shape having a first base overlying said support member and secured thereto;
   a spring cradle of U-shape having a second base at a generally right angle to said first base and a pair of spaced apertured support arms nested within said spring support;
   a pivot bolt assembly mounted upon and extending through said spring support and spring cradle along said second axis;
   said blade support assembly also including a blade adapted to scrape the endless belt;
   a spring arm at one end secured to said blade and extending towards said spring cradle;
   and a helical spring within said spring cradle mounted upon said pivot bolt assembly and having one end anchored to said cradle and having its other end extending laterally of said second axis and connected to said spring arm;
   said spring cradle being adapted for angular adjustment relative to said spring support about said second axis to adjust said spring arm and to thereby position said blade in operative engagement with the endless belt.

2. In the conveyor belt cleaner of claim 1, the securing of said first base including a pair of spaced depending mount flanges straddling said support member and secured thereto.

3. In the conveyor belt cleaner of claim 1, lock washers mounted upon said pivot bolt assembly interposed between said spring support and the arms of said spring cradle to facilitate securing of said cradle relative to said spring support.

4. In the conveyor belt cleaner of claim 1, said spring support including a pair of spaced apertured tabs extending at right angles to said first base and receiving the corresponding arms of said spring cradle and pivotally connected thereto.

5. In the conveyor belt cleaner of claim 1, a sleeve located within said spring cradle on said pivot bolt assembly receiving and extending through said helical spring along its length.

6. In the conveyor belt cleaner of claim 1, wherein said blade support assembly is longitudinally adjustable upon said support member.

7. In the conveyor belt cleaner of claim 1, wherein
   a plurality of said blade support assemblies are individually mounted upon and secured to said elongated support member;
   the blade support assemblies being individually adjustable for independent positioning of corresponding blades with respect to the conveyor belt.

8. In the conveyor belt cleaner of claim 1,
   said helical spring at said one end extending through an aperture in said second base and interlocked therewith;
   said other end of said helical spring merging with said spring arm as an integral part thereof.

9. In the conveyor belt cleaner of claim 1,
   said support member being an elongated tube;
   said conveyor including a support housing having spaced side walls, said tube at its ends extending to said walls;
   and end plates upon the ends of said tube and secured to said side walls.

10. A blade support assembly for a conveyor belt cleaner having a blade for scraping the surface of an endless belt of a conveyor;
    said blade support assembly being adapted to retain and yieldably hold the blade in engagement with the endless belt;
    said blade support assembly including a spring support of U-shape having a first base mountable upon a support;
    a spring cradle of U-shape having a second base generally at a right angle to said first base and a pair of spaced apertured support arms nested within said spring support;
    a pivot bolt assembly mounted upon and extending through said spring support and spring cradle along an axis;
    a spring arm at one end secured to the blade and extending towards said spring cradle;
    and a helical spring within said spring cradle mounted upon said pivot bolt assembly and having one end anchored to said cradle and having its other end extending laterally of said axis and connected to said spring arm as an integral part thereof;
    said spring cradle being adapted for angular adjustment relative to said spring support about said axis to adjust said spring arm.

11. In the blade support assembly of claim 10, said first base including a pair of spaced depending mount flanges adapted to straddle and to be secured to a support member.

12. In the blade support assembly of claim 10, lock washers mounted upon said pivot bolt assembly interposed between said spring support and the arms of said cradle to facilitate securing of said cradle relative to said spring support.

13. In the blade support assembly of claim 10, said spring support including a pair of spaced apertured tabs extending at right angles to said first base and receiving the corresponding arms of said spring cradle and pivotally connected thereto.

14. In the blade support assembly of claim 10, a sleeve located within said spring cradle on said pivot bolt assembly receiving and extending through said helical spring along its length.

15. In the blade support assembly of claim 10, said helical spring at said one end extending through an aperture in said second base and interlocked therewith.

* * * * *